United States Patent [19]

Lunney

[11] Patent Number: 4,904,707
[45] Date of Patent: Feb. 27, 1990

[54] NOVEL POLYOL COMPOSITION AND THE USE THEREOF IN THE PREPARATION OF RIGID POLYURETHANE FOAMS

[75] Inventor: Soheila R. Lunney, Pittsburgh, Pa.

[73] Assignee: Mobay Corporation, Pittsburgh, Pa.

[21] Appl. No.: 287,935

[22] Filed: Dec. 21, 1988

[51] Int. Cl.$^4$ .............................................. C08G 18/50
[52] U.S. Cl. .................................... 521/164; 521/167
[58] Field of Search ................................ 521/164, 167

[56] References Cited

U.S. PATENT DOCUMENTS

| 4,209,609 | 6/1980 | Haas | 528/421 |
| 4,243,759 | 1/1981 | Haas | 521/167 |
| 4,397,966 | 8/1983 | Stolz et al. | 521/167 |
| 4,410,641 | 10/1983 | Narayan et al. | 521/167 |
| 4,421,871 | 12/1983 | Korczak et al. | 521/167 |
| 4,469,822 | 9/1984 | Stolz et al. | 521/167 |
| 4,562,290 | 12/1985 | Korczak et al. | 564/399 |
| 4,614,754 | 9/1986 | Christman | 521/167 |
| 4,664,563 | 5/1987 | Christman | 405/288 |
| 4,767,795 | 8/1988 | Adam et al. | 521/99 |

FOREIGN PATENT DOCUMENTS 1311095  3/1973  United Kingdom .

Primary Examiner—Maurice J. Welsh
Assistant Examiner—Rabon Sergent
Attorney, Agent, or Firm—Joseph C. Gil

[57] ABSTRACT

The present invention is directed to a novel polyol composition and the use thereof in the preparation of a rigid polyurethane foam. More particularly the polyol composition is a blend of specific amounts of two polyols, one based on ortho-toluene diamine and the other based on a non-ortho-toluene diamine.

4 Claims, No Drawings

NOVEL POLYOL COMPOSITION AND THE USE THEREOF IN THE PREPARATION OF RIGID POLYURETHANE FOAMS

BACKGROUND OF THE INVENTION

Reaction products of ortho-toluene diamine and alkylene oxides have been described in the art (note British Patent No. 1,311,095). Also described in the art is the propoxylated product of a mixture of 51% by weight of ortho-toluene diamine and 49% by weight of meta-toluene diamine (see Example 3 of the above identified British patent).

Toluene diamine initiated polyols derived from ethylene and propylene oxide are also known and described in the art (see U.S. Pat. Nos. 4,209,609 and 4,243,759). Alkylene oxide adducts of ortho-toluene diamine are also known. U.S. Pat. No. 4,562,290 describes adducts prepared by first reacting one to three moles of ethylene oxide with ortho-toluene diamine, and then reacting the resultant product with from four to eight moles of propylene oxide. The resultant products are described as being useful in the production of rigid polyurethane foams. The '290 patent suggests that the adducts described therein can be blended with a variety of different polyols. Among the polyols suggested as being useful are alkylene oxide adducts of a variety of different aromatic amines including 2,4-diaminotoluene.

Finally, a variety of different adducts of ortho-toluene diamines and alkylene oxides are described in U.S. Pat. Nos. 4,397,966, 4,410,641, 4,421,871, 4,469,822, and 4,767,795.

While all these various adducts based on ortho-toluene diamine have been known for some time, they have not met with any substantial commercial success primarily because when substituted for more conventional polyols, the resultant foams will vary in k-factor, and various physical properties with variations in product density.

DESCRIPTION OF THE INVENTION

The present invention is directed to a novel polyol composition and its use in the production of rigid polyurethane foams to be used in the appliance industry. The novel polyol composition of the present invention provides foams at varying densities having comparable thermal properties (i.e. k-factor) while maintaining physical properties and having good processing and excellent demold properties. Molded core densities in foams used in the appliance industry typically range from 1.45 pounds per cubic foot to 2.00 pounds per cubic foot. More particularly, the present invention is directed to a polyol composition comprising:

(a) an adduct obtained by sequentially reacting 2,4- and/or 2,6-toluene diamine with from 3 to 5 moles of ethylene oxide and then with from 1 to 5.1 moles of propylene oxide, the total number of moles of ethylene oxide plus propylene oxide being at least 5 and no more than 8.1, and (b) an adduct obtained by sequentially reacting 2,3- and/or 3,4-toluene diamine with from 1 to 5 moles of ethylene oxide and then with from 1 to 6 moles of propylene oxide, the total number of moles of ethylene oxide plus propylene oxide being at least 5 and no more than 9, the weight ratio of component (a) to component (b) being from 35:65 to 70:30, and preferably from 50:50 to 70:30, and most preferably 50:50.

The adducts used herein are known in the art. Thus, adducts based on 2,4- and/or 2,6-toluene diamine and their method of manufacture are described in U.S. Pat. Nos. 4,209,609 and 4,243,759, the disclosures of which are herein incorporated by reference. The adducts based on 2,3- and/or 3,4-toluene diamine and their methods of manufacture are described in U.S. Pat. Nos. 4,562,290, and 4,767,795, the disclosures of which are herein incorporated by reference.

The novel polyol compositions herein are used to prepare polyurethane foams.

The various methods for the preparation of polyurethane foams are well known in the art and do not require detailed discussion; see, for example, Dombrow, "Polyurethanes," Reinhold Publishing Corporation, New York, pages 1–105 (1957); Saunders et al, "Polyurethanes", Part I, Interscience Publishers, New York (1962). One common procedure consists in reacting a polyol, for example, a polyester or polyether, with an organic polyisocyanate and with a blowing agent, if necessary in the presence of catalysts, surface active agents or other auxiliary agents, whereby simultaneous interaction between the isocyanate, blowing agent and the polyol occurs to give the required foam product. This is the so-called "one-shot" procedure. Alternatively, the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amine, for example, aniline, o-chloroaniline, o-toluidine, or mixtures thereof. Such polyisocyanates are known in the art, e.g., U.S. Pat. Nos. 2,683,730, 2,950,263 and 3,012,008; Canadian Patent No. 665,495; and German Patent No. 1,131,877. A particularly preferred polyisocyanate of this type is the polymethylene poly(phenylisocyanate) available commercially as Mondur MR, from Mobay Corporation.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with reactive hydrogen containing compounds can be employed for this purpose; see, for example, Saunders et al., Ibid, Volume I, pages 228–232; see, also Britain et al., "J. Applied Polymer Science," 4,207–4,211, 1960. Such catalysts include organic and inorganic acid salts of and organometalic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N',N'-tetraethylethylene diamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. This ratio is advantageously within the range of from 1.50 to 0.65:1 and preferably within the range of 1.20:1 to 1:1, whether the isocyanate and polyol are employed separately in the one-shot process or whether the two components have been reacted to form a prepolymer.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C., such as a volatile aliphatic hydrocarbon or a volatile highly halogenated hydrocarbon, for example, trichloromonofluoromethane, chlorotrifluoromethane, 1,1-dichloro-1-fluoroethane, 1-chloro-1,1-difluoro-2,2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus, a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L5420 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The polyurethane foams produced using the novel polyols of the instant invention are useful in a variety of commercial and industrial applications including for example, the production of foam-insulation, structural foam sporting goods, and the like.

The following examples are provided to illustrate the present invention. Unless otherwise specified, all parts are by weight.

EXAMPLES

In the examples, the following materials were used:

POLYOL A: a 460 OH number polyol prepared by sequentially reacting 1 mole of a 80/20 mixture of 2,4- and 2,6-toluene diamine with about 3.7 moles of ethylene oxide and then with about 3.3 moles of propylene oxide.

POLYOL B: a 395 OH number polyol prepared by sequentially reacting 1 mole of a mixture of 2,3- and 3,4-toluene diamine with about 3.5 moles of ethylene oxide and then with about 4.5 moles of propylene oxide.

POLYOL C: a 380 OH number polyol prepared by sequentially reacting 1 mole of the diamine mixture used in POLYOL B with about 4.3 moles of ethylene oxide and then with about 3.7 moles of propylene oxide.

POLYOL D: a 420 OH number polyol prepared by sequentially reacting 1 mole of the diamine mixture used in POLYOL B with about 4.6 moles of ethylene oxide and then with about 3.6 moles of propylene oxide.

Y-10325: a polyalkyleneoxide/methyl siloxane copolymer surfactant available from Union Carbide.

PV: Desmorapid PV, a pentamethyldiethylenetriamine available from Rhein-Chemie.

PC-8: Polycat 8, a dimethylcyclohexylamine available from Air Products.

R-11: trichlorofluoromethane.

WATER

ISO: Mondur MR, a polymethylenepoly(phenylisocyanate) having an isocyanate content of about 31.5%, commercially available from Mobay Corporation.

A handmixing technique was used to measure reactivity and foaming performance of high and low density rigid foams. The temperature of the raw materials was kept at 20° C.±0.2° C. The B-side was prepared by weighing the polyol, surfactant, catalysts and R-11, in that order, into a previously weighed mixing container. After mixing thoroughly, the mixing container was reweighed and the evaporated R-11 was replaced. To another container was added the required amount of isocyanate. The contents of both containers were adjusted to 20° C.±0.2° C. The isocyanate was then added to the B-side. The timer was started and the components were mixed at 1000 rpm. The mixture was stirred for about 3 seconds. After mixing was complete, the reaction mixture was poured into a large paper container and the reaction times were recorded.

The products were then tested for k-factor (ASTM C-518) and densities (ASTM D-1622). The formulations were as indicated in Table 1, while the test results were as set forth in Table 2.

TABLE 1

| Example # | 1 | 2 | 3 | 4 | 5 | 6 | 7 | 8 | 9* | 10* |
|---|---|---|---|---|---|---|---|---|---|---|
| Ingredients, parts by weight | | | | | | | | | | |
| B-Side: | | | | | | | | | | |
| POLYOL A | 35.42 | 30.53 | 35.42 | 30.53 | 35.42 | 30.53 | 49.59 | 42.74 | 21.25 | 18.32 |

TABLE 1-continued

| | | | | | | | | | | |
|---|---|---|---|---|---|---|---|---|---|---|
| POLYOL B | 35.42 | 30.53 | — | — | — | — | 21.25 | 18.32 | 49.59 | 42.74 |
| POLYOL C | — | — | 35.42 | 30.53 | — | — | — | — | — | — |
| POLYOL D | — | — | — | — | 35.42 | 30.53 | — | — | — | — |
| PV | 0.5 | 0.45 | 0.5 | 0.45 | 0.5 | 0.45 | 0.5 | 0.45 | 0.5 | 0.45 |
| PC-8 | 1.0 | 1.35 | 1.0 | 1.35 | 1.0 | 1.35 | 1.0 | 1.35 | 1.0 | 1.35 |
| Y-10325 | 1.0 | 1.0 | 1.0 | 1.0 | 1.0 | 1.0 | 1.0 | 1.0 | 1.0 | 1.0 |
| WATER | 1.66 | 1.14 | 1.66 | 1.14 | 1.66 | 1.14 | 1.66 | 1.14 | 1.66 | 1.14 |
| R-11 | 25 | 35 | 25 | 35 | 25 | 35 | 25 | 35 | 25 | 35 |
| A-Side | | | | | | | | | | |
| ISO | 98.77 | 80.67 | 98.67 | 80.67 | 102.34 | 83.75 | 101.95 | 83.42 | 97.25 | 79.36 |
| Wt. Ratio Non-vicinal: Vicinal TDA Polyol | 50:50 | 50:50 | 50:50 | 50:50 | 50:50 | 50:50 | 70:30 | 70:30 | 30:70 | 30:70 |

| Example # | 11 | 12 | 13 | 14 | 15 | 16 | 17 | 18 | 19 | 20 | 21 | 22 |
|---|---|---|---|---|---|---|---|---|---|---|---|---|
| Ingredients, parts by weight | | | | | | | | | | | | |
| B-Side: | | | | | | | | | | | | |
| POLYOL A | 46.05 | 39.69 | 24.79 | 21.37 | 42.5 | 36.64 | 28.32 | 24.42 | 38.96 | 33.58 | 31.88 | 27.48 |
| POLYOL B | 24.79 | 21.37 | 46.05 | 39.69 | 28.34 | 24.42 | 42.50 | 36.64 | 31.88 | 27.58 | 38.96 | 33.58 |
| POLYOL C | — | — | — | — | — | — | — | — | — | — | — | — |
| POLYOL D | — | — | — | — | — | — | — | — | — | — | — | — |
| PV | 0.5 | 0.45 | 0.5 | 0.45 | 0.5 | 0.45 | 0.5 | 0.45 | 0.5 | 0.45 | 0.5 | 0.45 |
| PC-8 | 1.0 | 1.35 | 1.0 | 1.35 | 1.0 | 1.35 | 1.0 | 1.35 | 1.0 | 1.35 | 1.0 | 1.35 |
| Y-10325 | 1.0 | 1.0 | 1.0 | 1.0 | 1.0 | 1.0 | 1.0 | 1.0 | 1.0 | 1.0 | 1.0 | 1.0 |
| WATER | 1.66 | 1.14 | 1.66 | 1.14 | 1.66 | 1.14 | 1.66 | 1.14 | 1.66 | 1.14 | 1.66 | 1.14 |
| R-11 | 25 | 35 | 25 | 35 | 25 | 35 | 25 | 35 | 25 | 35 | 25 | 35 |
| A-Side | | | | | | | | | | | | |
| ISO | 101.47 | 83.0 | 97.8 | 79.85 | 100.7 | 82.4 | 98.51 | 80.4 | 101.8 | 83.25 | 100.6 | 82.2 |
| Wt. Ratio Non-vicinal: Vicinal TDA polyol | 65:35 | 65:35 | 35:65 | 35:65 | 60:40 | 60:40 | 40:60 | 40:60 | 55:45 | 55:45 | 45:55 | 45:55 |

*9 and 10 are comparative examples

TABLE 2

| Example # | 1 | 2 | 3 | 4 | 5 | 6 | 7 | 8 | 9 | 10 | 11 |
|---|---|---|---|---|---|---|---|---|---|---|---|
| Test | | | | | | | | | | | |
| Reactivity Times | | | | | | | | | | | |
| Cream (sec) | 8 | 7 | 8 | 8 | 7 | 7-8 | 10 | 7-8 | 6 | 6 | 7 |
| Gel (sec) | 39 | 37 | 37 | 40 | 36 | 38 | 39 | 37 | 37 | 37 | 38 |
| Flow (sec) | 119 | 140 | 119 | 140 | 118 | 140 | 121 | 140 | 124 | 143 | 120 |
| Densities (pcf) | | | | | | | | | | | |
| Free Rise | 1.35 | 1.08 | 1.37 | 1.09 | 1.36 | 1.08 | 1.30 | 1.11 | 1.28 | 1.12 | 1.34 |
| Molded Core | 1.67 | 1.49 | 1.68 | 1.55 | 1.67 | 1.56 | 0.64 | 1.64 | 1.70 | 1.62 | 1.68 |
| Freeze Stable | 1.92 | 1.74 | 1.93 | 1.77 | 1.99 | 1.75 | 1.86 | 1.86 | 1.87 | 1.86 | 1.86 |
| K-Factor (molded core) (BTU in/ft$^2$HR °F.) | 0.128 | 0.125 | 0.126 | 0.126 | 0.123 | 0.121 | 0.125 | 0.122 | 0.122 | 0.127 | 0.121 |
| % Difference of K-factor between densities | | −2.3% | | 0 | | −1.6% | | −2.4% | | +4.1% | |

| Example # | 12 | 13 | 14 | 15 | 16 | 17 | 18 | 19 | 20 | 21 | 22 |
|---|---|---|---|---|---|---|---|---|---|---|---|
| Test | | | | | | | | | | | |
| Reactivity Times | | | | | | | | | | | |
| Cream (sec) | 7 | 7-8 | 6 | 7-8 | 7 | 6 | 6 | 8 | 7 | 8 | 6 |
| Gel (sec) | 36-37 | 37 | 36 | 37 | 36 | 37 | 37 | 37 | 36 | 36 | 36 |
| Flow (sec) | 139 | 121 | 138 | 118 | 138 | 120 | 138 | 121 | 140 | 121 | 140 |
| Densities (pcf) | | | | | | | | | | | |
| Free Rise | 1.11 | 1.34 | 1.13 | 1.33 | 1.10 | 1.33 | 1.10 | 1.34 | 1.12 | 1.31 | 1.10 |
| Molded Core | 1.59 | 1.65 | 1.62 | 1.69 | 1.60 | 1.68 | 1.66 | 1.65 | 1.63 | 1.66 | 1.64 |
| Freeze Stable | 1.84 | 1.85 | 1.84 | 1.86 | 1.84 | 1.86 | 1.90 | 1.86 | 1.86 | 1.86 | 1.86 |
| K-Factor (molded core) (BTU in/ft$^2$HR °F.) | 0.123 | 0.123 | 0.124 | 0.121 | 0.122 | 0.124 | 0.123 | 0.125 | 0.126 | 0.125 | 0.126 |
| % Difference | +1.7% | | +1.0% | | +1.0% | | −1.0% | | +1.0% | | +1.0% |

What is claimed is:

1. A process for producing a polyurethane foam comprising: reacting an organic di- and/or polyisocyanate with a polyol in the presence of a blowing agent, said polyol comprising:

(a) an adduct obtained by sequentially reacting 2,4- and/or 2,6-toluene diamine with from 3 to 5 moles of ethylene oxide and then with from 1 to 5.1 moles of propylene oxide, the total number of moles of ethylene oxide plus propylene oxide being at least 5 and no more than 8.1, and (b) an adduct obtained by sequentially reacting 2,3- and/or 3,4-toluene diamine with from 1 to 5 moles of ethylene oxide and then with from 1 to 6 moles of propylene oxide, the total number of moles of ethylene oxide plus propylene oxide being at least 5 and no more than 9, the weight ratio of component (a) to component (b) being from 35:65 to 70:30.

2. The process of claim 1 wherein the weight ratio of component (a) to component (b) is from 50:50 to 70:30.

3. The process of claim 2 wherein said weight ratio is 50:50.

4. A polyurethane foam produced by the process of claim 1.

* * * * *